United States Patent [19]
Anthony

[11] 3,884,601
[45] May 20, 1975

[54] ROTARY ENGINE ROTOR SEAL LUBRICATION

[75] Inventor: Parme G. Anthony, Centerville, Ohio

[73] Assignee: General Motors Corporation, Detroit, Mich.

[22] Filed: Sept. 24, 1973

[21] Appl. No.: 400,365

[52] U.S. Cl. .................. 418/90; 418/94; 418/179
[51] Int. Cl. ............................................ F04c 29/02
[58] Field of Search .............. 418/90, 91, 94, 179; 123/196 R; 184/6.16

[56] References Cited
UNITED STATES PATENTS

| | | |
|---|---|---|
| 3,176,915 | 4/1965 | Bentele et al. .................. 418/94 X |
| 3,261,334 | 7/1966 | Paschke .......................... 418/91 X |
| 3,622,254 | 11/1971 | LeBlanc, Jr. ..................... 418/179 X |

Primary Examiner—C. J. Husar
Assistant Examiner—Leonard Smith
Attorney, Agent, or Firm—Ronald L. Phillips

[57] ABSTRACT

A rotary engine having a rotor of metal whose porosity is determined to provide for cooling oil delivered to the interior of the rotor to be centrifuged therethrough to the engine's working chambers to lubricate seals on the rotor that seal these chambers.

2 Claims, 3 Drawing Figures

ROTARY ENGINE ROTOR SEAL LUBRICATION

This invention relates to rotary engine rotor seal lubrication and more particularly to a rotary engine rotor structure that delivers cooling oil from within to effect the seal lubrication.

It is common practice in rotary engines, wherein seals mounted on the rotor seal the engine's chambers, to provide an oil metering pump that is driven by the engine and controlled with the engine's throttle to meter oil for seal lubrication at a rate that increases with increasing engine speed and throttle demand and thus with increasing engine load. The oil thus metered from the pump can be delivered either indirectly to the gas seals such as by delivering the oil to mix with the fuel prior to induction into the engine or by metering the oil directly on to the walls on which these seals slide. Typically, such pumps are costly in that they are complex and require precision parts. In addition, they require external linkage. Elimination of this pump and the accompanying external linkage without incurring an equivalent cost substitution is therefore highly desirable.

According to the present invention, there is provided in a rotary engine having an internally oil-cooled rotor a rotor structure that effects adequate lubricant supply to lubricate the seals on the rotor without the use of any such pump. This is very simply accomplished by constructing the rotor of a metal whose porosity is determined to provide for a proper proportion of the cooling oil delivered to the interior thereof to be centrifuged through the rotor's walls to the engine's working chambers where it can then act to lubricate the seals on the rotor that seal these chambers. Since this seal lubricant supply is forced by the centrifugal effect on the rotating body of cooling oil in the rotor, the porous rotor meters this seal lubricant supply at a rate that increases exponentially with rotor speed with the porosity determined to provide adequate and efficient seal lubrication over the engine's useful speed range.

An object of the present invention is to provide a new and improved rotary engine rotor seal lubricant supply arrangement.

Another object is to provide in a rotary engine having an internally oil-cooled rotor a rotor made of a material whose porosity effects a proper proportion supply of cooling oil to adequately and effectively lubricate the seals at a rate that increases with increasing rotor speed over the engine's speed range.

Another object is to provide in a rotary engine having an internally oil-cooled rotor a rotor structure having material whose porosity is effective to provide sufficient oil delivery therethrough to adequately lubricate the rotor seals at minimum rotor speed and load and to provide increasing oil delivery at an exponential rate with increasing rotor speed over the engine's speed range.

These and other objects of the present invention will be more apparent from the following description and drawing in which.

Figure 1:
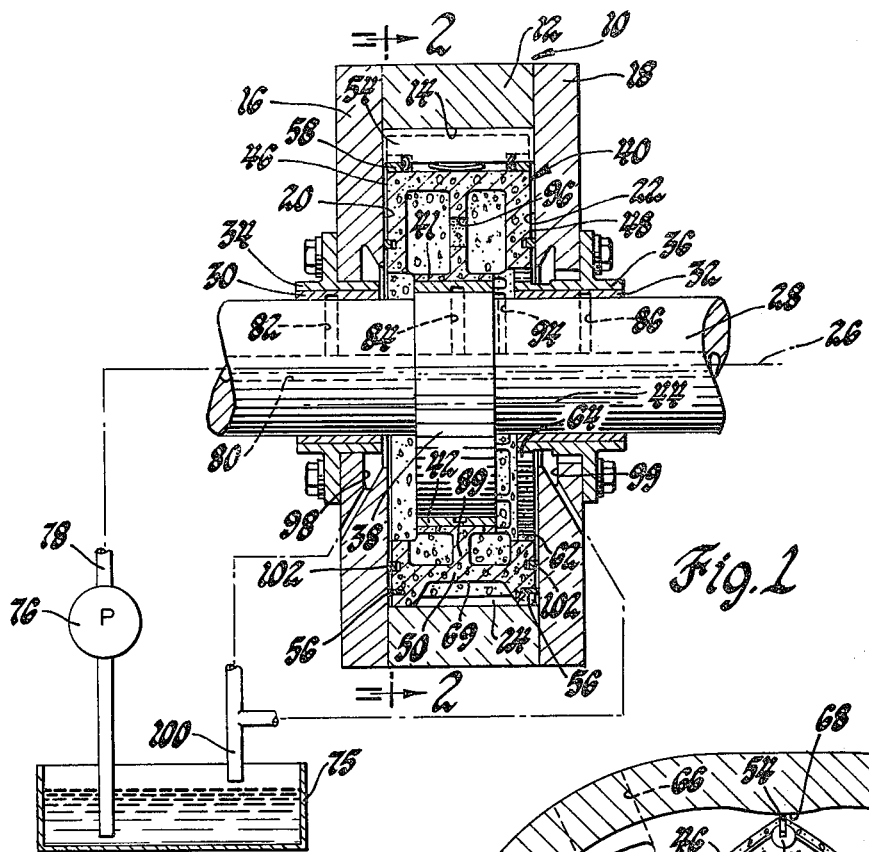
FIG. 1 is a view with parts in section and some parts shown schematically of a rotary combustion engine having a rotor seal lubrication structure according to the present invention.
Figure 2:
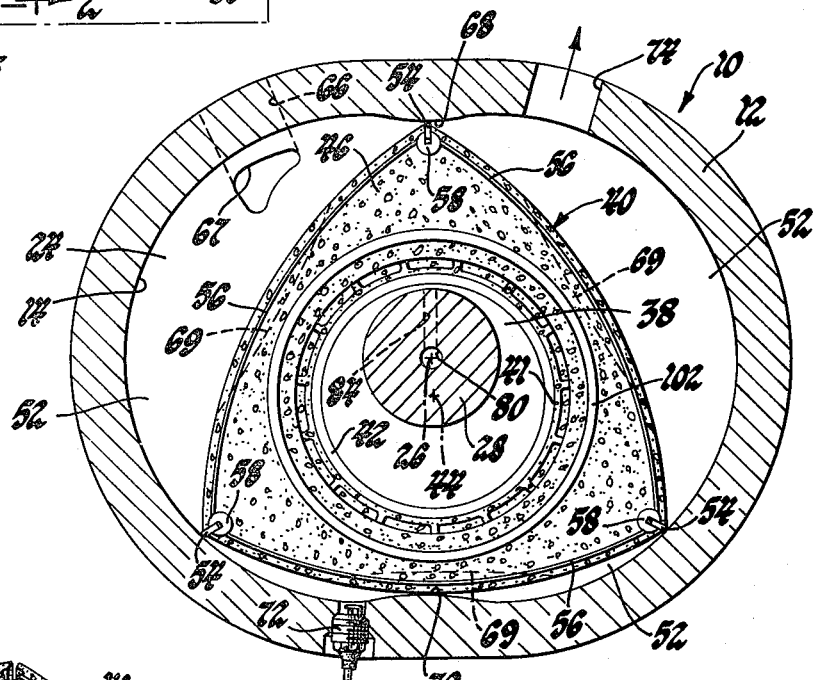
FIG. 2 is a view taken along the line 2—2 in FIG. 1.
Figure 3:
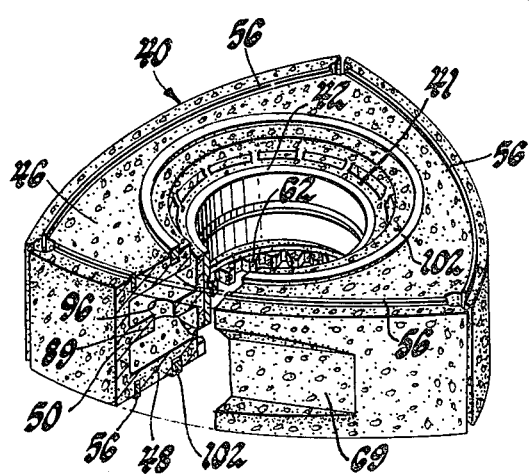
FIG. 3 is a perspective view of the rotor in FIGS. 1 and 2.

The seal lubricant arrangement according to the present invention is particularly suited for use in a rotary combustion engine of the planetary type such as shown in FIGS. 1 and 2. The engine comprises a metal housing 10 which in a single rotor arrangement has basically three parts, namely a rotor housing 12 having an inwardly facing inner peripheral wall 14 and a pair of end housings 16 and 18 having parallel, oppositely facing, spaced inner end walls 20 and 22, respectively. The housing parts are secured together by bolts, not shown, and the inner housing walls 14, 20 and 22 cooperatively provide a cavity 24. As shown in FIG. 2, the peripheral wall is in the shape of a two-lobed epitrochoid or a curve parallel thereto whose center line is indicated at 26. A crankshaft 28 extends through the cavity 24 and is rotatably supported in sleeve bearings 30 and 32 which are secured in collars 34 and 36 that are bolted to the end housings 16 and 18 as shown in FIG. 1, the crankshaft axis being coincident with the center line 26, parallel to the peripheral wall 14 and at right angles to the end walls 20 and 22. The crankshaft 28 is provided in the cavity 24 with an eccentric 38. A hollow metal rotor 40 has a hub 41 having a sleeve bearing 42 secured therein which is received on the eccentric 38 so that the rotor is thereby supported for rotation about the eccentric's center line 44 which is thus the rotor's axis.

The rotor 40 has the general shape of a triangle with two parallel side walls 46 and 48 at right angles to the rotor axis which face and run close to the end walls 20 and 22, respectively, and a peripheral wall 50 having three arcuate outer faces which face the peripheral wall 14 and cooperate therewith and with the end walls 20 and 22 to define three variable volume working chambers 52. Sealing of these three chambers from each other is effected by sealing means comprising three apex seals 54 which are each mounted in an axially extending groove or slot at each apex or corner of the rotor 40 and extend the width thereof. Three arcuate side seals 56 are mounted in accommodating grooves in each rotor side and extend adjacent the rotor faces between two of the apex seals 54. Three cylindrical corner seals 58 are mounted in cylindrical blind bores in each rotor side with each corner seal providing sealing between the ends of two side seals and one apex seal as shown in FIG. 2. The apex seals 54 are spring biased to continuously engage the peripheral wall 14 and both the side seals 56 and the corner seals 58 are spring biased to continuously engage the respective end walls 20 and 22 with the complete gas seal arrangement acting to seal the working chambers.

With the two-lobed peripheral wall 14 and the three corner rotor 40, each of the working chambers 52 sequentially expands and contracts between minimum and maximum volume twice during each revolution in fixed relation to the housing by forcing the rotor to rotate at one-third the speed of the crankshaft. This is accomplished by gearing comprising an internal tooth gear 62 which is formed integral with one side 48 of the rotor and concentric with the rotor axis. The gear 62 meshes with an external tooth annular gear 64 which is freely received about and is concentric with the crankshaft 28 and is made stationary by being formed integral with the left-hand end of the right-hand collar 36 as shown in FIG. 1. The gear 62 has one and one-half times the number of teeth as the gear 64 to provide the required speed ratio of 3:1 between the crankshaft and the rotor.

A combustible air-fuel mixture from a suitable carburetor arrangement, not shown, is made available to each working chamber 52 by an intake passage 66 shown in FIG. 2. Passage 66 extends through the engine housing and opens to the cavity through aligned ports 67 in the end walls 46 and 48 that are located on the leading side of cusp 68 of the peripheral wall 14 relative to the direction of rotor rotation indicated by the arrow in FIG. 2, there being only one such intake port appearing in this view. A single channel or recess 69 is provided in the center of each chamber face of the rotor to provide for the transfer of the working gas past the peripheral wall's other cusp 70 while the rotor face is at or near a top-dead-center position, as shown in FIG. 2, so that the chambers are not divided by the cusp 70 at the time when combustion is occurring therein. A spark plug 72 is mounted in the rotor housing 12 adjacent the cusp 70 with its electrodes exposed to the passing working chambers. As the rotor planetates, the working chambers successively draw in fuel mixture as the rotor sides radially outward of the side seals 56 periodically uncover the intake ports 67. The fuel mixture is then trapped in each working chamber and compressed and when the rotor face of this chamber is in the vicinity of top-dead-center, this mixture is ignited at the completion of the compression phase, there being provided a suitable ignition system, not shown, for applying voltage to the spark plug at the proper time. Upon ignition of the mixture in each working chamber, the peripheral wall 14 takes the reaction forcing the rotor to continue rotating while the gas is expanding. The leading apex seal 54 of each of the working chambers eventually traverses an exhaust passage 74 in the rotor housing on the trailing side of the cusp 68 whereby the exhaust products are then expelled to complete the cycle.

Describing now the lubrication of this arrangement, except for the seals, and also the cooling of the rotor, oil from the engine drains to a sump 75 from which it is drawn by a suitable pump 76 powered from the engine crankshaft 28 and then delivered via a delivery line 78 to an axial oil passage 80 through the crankshaft 28. Radial oil passages 82, 84 and 86 in the crankshaft deliver oil from the passage 80 to lubricate the sleeve bearings 30, 42 and 32, respectively. The hollow rotor 40 is of the so-called I-beam type as shown in cross-section with a central radially extending rib 89 between the rotor's peripheral wall 50 and the hub 41 and with the rotor side walls 46 and 48 extending radially inward from the peripheral wall with annular spaces left between these side walls and rotor hub. A radial oil passage 94 in the crankshaft 28 delivers oil from the passage 80 radially outward between the right-hand side of the eccentric 38 and the left-hand side of the timing gears 62 and 64 to the interior of the rotor for cooling. The oil passes from the right to the left side of the central rib 89 via axially extending, angularly spaced holes 96 therethrough with the oil carrying the heat from the rotor by passing out the opposite side openings in the rotor to annular cavities 98 and 99 in the respective end walls 20 and 22. The cavities 98 and 99 are connected to branches of a return line 100 that drains to sump 75. A circular oil seal 102 mounted in an accommodating groove in each side wall of the rotor so that it is centered on the rotor axis in a radial location inward of the side seals 56 is biased by suitable spring means not shown to engage the opposite housing end wall to prevent the oil from reaching the gas seals.

The engine structure thus far described is of a conventional type with lubrication of all but the gas seals 54, 56 and 58 provided by the pump 76 feeding oil to the sleeve bearings and the rotor cooled by the oil circulated therethrough. In such an engine, lubrication of these gas seals is normally provided by an oil metering pump that meters oil to either mix with the fuel prior to its induction into the working chambers or through oil feed ports in the housing directly into the chambers with this metering controlled to increase with increasing engine load to assure adequate seal lubrication. However, according to the present invention the need for such a metering pump is completely dispensed with by constructing the rotor 40 with a predetermined porosity. This porosity is such that the centrifugal forces on the body of cooling oil in the rotor are effective to force oil to diffuse out through the porous rotor walls entrapping the oil and into the working chambers 52. The porosity of the rotor 40 is determined so that oil diffusion through the peripheral wall 50 and side walls 46 and 48 radially outward of the side seals 56 is at a rate that in addition to providing adequate supply directly to the side seals 56 and 58 also maintains enough oil on the exterior of the rotor exposed to the working chambers to be slung by rotor rotation against the peripheral wall 14 to adequately and efficiently lubricate the apex seals at minimum rotor speed and load. Then as the engine speed increases, this gas seal lubricant supply increases at an exponential rate with increasing rotor speed as the result of the centrifugal forces to assure good gas seal lubrication over the engine's entire speed range.

In the preferred embodiment the rotor 40 is formed of a powdered metal with the predetermined porosity accomplished by the material mix and the manufacturing process, the required porosity thus being provided in a manner readily suited to high-volume mass production. A typical material mix giving the lubricant diffusion porosity according to the present invention suitable for use in production rotary engines is about 99.2% iron, about 0.8% graphite and about 0.75% lubricant. The powder is briquetted in the rotor shape to about 6.8 grams per cc green density and then about 5–10% copper is infiltrated into the briquetted powder metal rotor during sintering thereof. This percentage of copper is dependent on the green part weight and decreases with increasing density. During sintering, the copper infiltrates the then relatively highly porous briquetted rotor structure to fill a high percentage of the interstics yet leave enough interconnected voids to produce the desired lubricant diffusion.

The above described embodiment is illustrative of the invention which may be modified within the scope of the appended claims.

I claim:

1. A rotary engine comprising an engine housing having an internal peripheral wall and oppositely facing side walls cooperatively defining a cavity, a shaft extending through said cavity and side walls and rotatably supported by said housing, a hollow powdered metal rotor located in said cavity and rotatably mounted on said shaft, said rotor having a circumferentially extending wall cooperating with said peripheral wall of said housing and oppositely facing radially extending side walls cooperating with said side walls of said housing to provide a plurality of chambers that are spaced about and move with said rotor while varying in volume as said rotor and said shaft rotate, said rotor having apex seals engaging said peripheral wall and side seals engaging said side walls to seal said chambers from each other, a source of oil, passage means for delivering the oil to and from the interior of said rotor, and said circumferentially extending wall and radially extending side walls of said rotor constructed of a metal having a porosity over the entire thickness thereof effective to permit oil to diffuse from the interior to the exterior of said rotor as the result of centrifugal forces on the body of oil within said rotor at a rate providing sufficient oil delivery to the exterior of said rotor to be flung outward by rotor rotation against said peripheral wall to adequately lubricate said apex seals at minimum rotor speed and load and as a result of continuing centrifuging action of the oil in the interior of said rotor providing increasing oil delivery to the exterior to increase the lubrication of all said seals with increasing rotor speed at an exponential rate.

2. A rotary engine comprising an engine housing having an internal peripheral wall and oppositely facing side walls cooperatively defining a cavity, a shaft extending through said cavity and side walls and rotatably supported by said housing, a hollow powdered metal rotor located in said cavity and rotatably mounted on said shaft, said rotor having a circumferentially extending wall cooperating with said peripheral wall of said housing and oppositely facing radially extending side walls cooperating with said side walls of said housing to provide a plurality of chambers that are spaced about and move with said rotor while varying in volume as said rotor and said shaft rotate, said rotor having apex seals engaging said peripheral wall and side seals engaging said side walls to seal said chambers from each other, a source of oil, passage means for delivering oil to and from the interior of said rotor, and said circumferentially extending wall and radially extending side walls of said rotor constructed of a metal having a porosity over the entire thickness thereof effective to permit oil to diffuse from the interior to the exterior of said rotor as the result of centrifugal forces on the body of oil within said rotor at a rate that in addition to providing adequate supply directly to said side seals for their lubrication also provides sufficient oil delivery to the exterior of said rotor to be flung outward by rotor rotation against said peripheral wall to adequately lubricate said apex seals at minimum rotor speed and load and as a result of continuing centrifugal action on the oil in the interior of said rotor delivering the oil to the exterior of said rotor to increase the lubrication of said seal means with increasing rotor speed at an exponential rate.

\* \* \* \* \*